United States Patent
Pogue

(10) Patent No.: US 10,219,099 B1
(45) Date of Patent: Feb. 26, 2019

(54) SYSTEM FOR COMPENSATION OF PRESENTATION BY WIRELESS DEVICES

(71) Applicant: AMAZON TECHNOLOGIES, INC., Seattle, WA (US)

(72) Inventor: Michael Alan Pogue, Sunnyvale, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/041,556

(22) Filed: Jul. 20, 2018

(51) Int. Cl.
| | |
|---|---|
| *H04S 7/00* | (2006.01) |
| *H04R 3/12* | (2006.01) |
| *H04R 5/04* | (2006.01) |
| *G06F 17/30* | (2006.01) |
| *G06F 17/18* | (2006.01) |
| *H04W 84/12* | (2009.01) |

(52) U.S. Cl.
CPC .............. *H04S 7/307* (2013.01); *G06F 17/18* (2013.01); *G06F 17/3005* (2013.01); *H04R 3/12* (2013.01); *H04R 5/04* (2013.01); *H04R 2420/07* (2013.01); *H04W 84/12* (2013.01)

(58) Field of Classification Search
CPC ........ H04R 3/12; H04R 5/04; H04R 2420/07; H04S 7/307; G06F 17/18; G06F 17/3005; H04W 84/12

USPC .......................................................... 381/98
See application file for complete search history.

(56) References Cited

U.S. PATENT DOCUMENTS

2018/0165056 A1* 6/2018 Lay ........................ H04H 60/80

* cited by examiner

*Primary Examiner* — Paul S Kim
(74) *Attorney, Agent, or Firm* — Lindauer Law, PLLC

(57) ABSTRACT

A group of devices connected on a network operate in conjunction with one another to present content. Individual devices may be wirelessly connected to presentation devices such as speakers. Skew is a delay between when content is sent to the presentation device and then output. Drift is a difference in timing of output between two or more presentation devices not synchronized to a common clock. Non-zero values of skew and drift may result in poor content presentation by the group. An actual rate at which data is transferred to a presentation device is measured and compared to an expected rate. This difference is analyzed to determine a drift value. The content to be delivered to the presentation device is resampled. During presentation the combination of the drift and the resampled content reduces skew. The drift value may also be used to lookup a skew value used to delay initial presentation.

20 Claims, 7 Drawing Sheets

SYSTEM FOR COMPENSATION OF PRESENTATION BY WIRELESS DEVICES

BACKGROUND

Devices may communicate with one another wirelessly. During operation data may be wirelessly sent to a presentation device.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
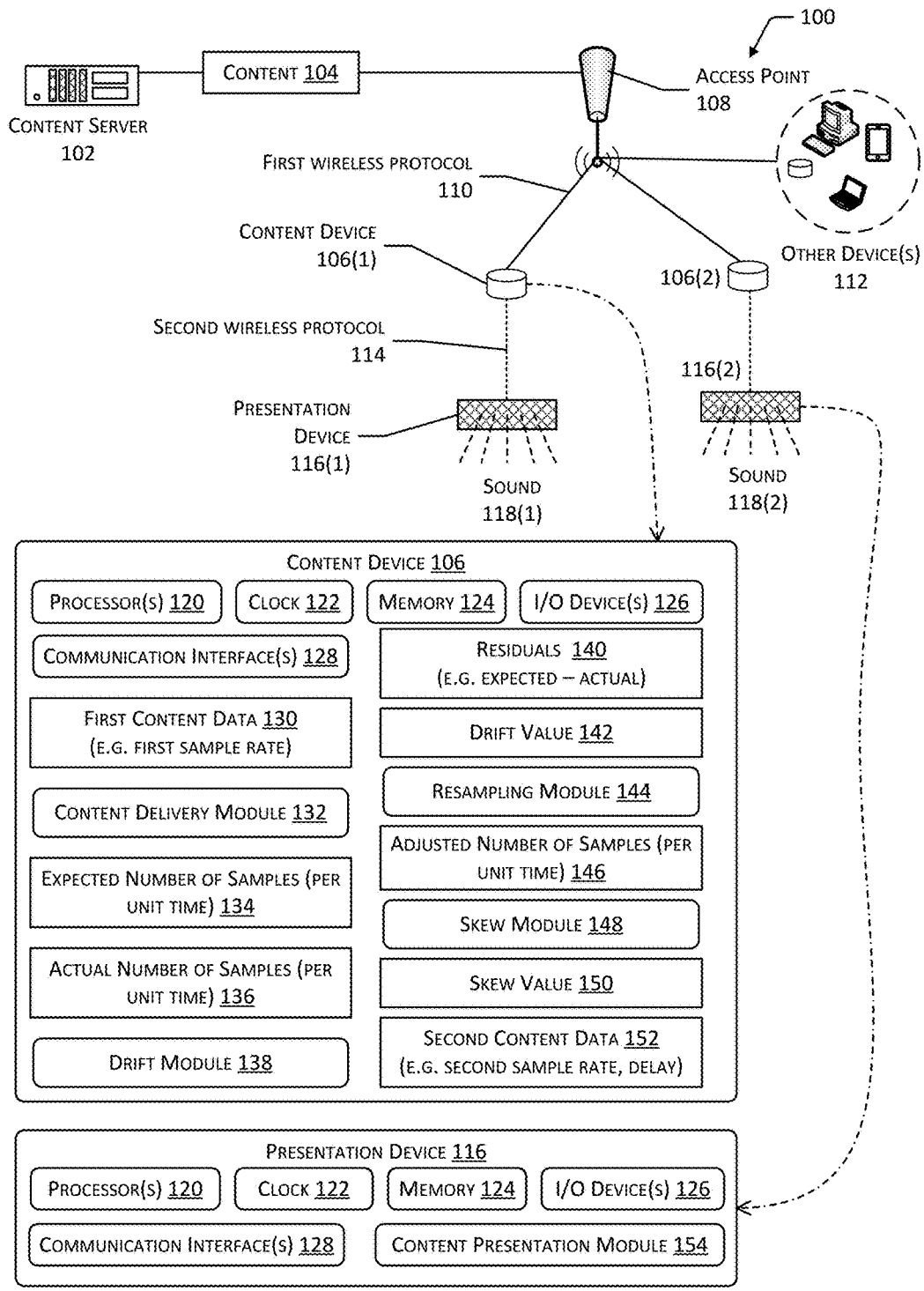
FIG. 1 illustrates a system that determines and compensates for drift and skew to synchronize output from a plurality of presentation devices, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Devices may communicate wirelessly with one another using one or more protocols. For example, a content device may retrieve content from an external source and send that content to a presentation device for output to a user.

The content device may connect with other content devices, presentation devices, and so forth using one or more protocols. For example, a content device may connect to a wireless local area network (WLAN) access point using a first protocol, such as WiFi. The access point may in turn connect to another network, such as a local area network (LAN), wide area network (WAN) such as the internet, and so forth. The content device may use the WLAN to retrieve data, such as content, from a server on the internet. The content may comprise audio, video, instructions to control a device such as a robot, and so forth.

The content device may include built-in output devices to present content or may use an external presentation device. The presentation device, such as a speaker, display device, and so forth, may be connected to the content device using another wireless protocol. For example, the content device may receive content using the first protocol, such as WiFi, and use the second protocol, such as Bluetooth, to send the content to a presentation device such as a wireless speaker that produces sound that is audible to a user.

In some situations, multiple presentation devices may be used. For example, a single content device may send content such as audio data to several presentation devices such as Bluetooth speakers, several content devices may each send audio data to respective Bluetooth speakers, and so forth. Each of these presentation devices then produces sound.

Ideally, the sound produced by the different speakers is time synchronized, such that audio begins at about the same time and ongoing presentation by the different speakers is within threshold values. Skew is a delay between presentation of the same or equivalent samples. For example, initial skew is indicative of the time delay between when content is sent to the presentation device and when the sound associated with the content is output from the speaker. A non-zero initial skew may result from various aspects of operation of the content device or the presentation device. For example, the non-zero initial skew may result from time spent filling a buffer of the presentation device, operation of a codec and associated circuitry that transforms audio data into time varying voltages that drive the speaker, and so forth.

Drift is a difference in timing of output of the same or equivalent samples that may result from variations in operation of different devices. Drift may be expressed as a change in skew per unit time. Drift becomes perceptible when the output from two or more presentation devices is not synchronized. Drift may result from variations in clock operation. For example, each presentation device may have an onboard clock that is used to provide timing for the circuitry that converts the content data into audio output. Continuing the example, the presentation device may process audio data that includes 44.1 kilosamples per second (44.1 k samples/second). This means that the presentation device is expected to process and output 44,100 samples of audio data each second and render that audio data as sound. In some implementations, the onboard clock of the presentation device generates a time signal that is used to determine when the next sample is to be processed, output, and so forth. If the onboard clock is running fast, that is, if individual "ticks" of that clock are occurring more frequently than expected, the actual number of samples that are output may be more. For example, in one second the presentation device may actually present 44,189 samples. The difference between the expected output rate of 44.1 k samples/second and the actual number of samples that are output results in a drift value of +89 samples per second. In another example, the onboard clock may "tick" more slowly, and in one second the presentation device may actually present 43,793 samples. Drift may result from the slight variations in manufacture of components used in the presentation device, changes in component values due to aging, temperature, and so forth. For example, the onboard clock may comprise a quartz crystal that is subject to some variation in its resonant frequency due to temperature. As a result, as the quartz crystal changes temperature, the frequency of the quartz crystal may change.

In the case of a single presentation device, drift may be imperceptible to the user. However, when more than one presentation device is used, the difference resulting from the drift can become noticeable and ultimately result in unusable output. Continuing the earlier example, as time goes on, the accumulated drift value for each presentation device increases, and a difference between the accumulated drift values of two or more presentation devices also increases. Time differences of 5 milliseconds (ms) or more between the sound may be perceptible, producing an "echo" type effect. Likewise, drift that produces a time delay between other types of content such as video presentation and audio output may be undesirable.

Skew and drift occurring individually or together can result in poor presentation of content. For example, non-zero skew values result in different presentation devices starting presentation of content out of time synchronization with one another. This difference then is exacerbated by drift of the various presentation devices. Environments in which content may be presented by different makes, models, and so forth of presentation devices are particularly challenging. For example, skew values may vary by make and model of presentation devices, while individual presentation devices may each exhibit different drift values during operation.

Several techniques may be used to determine one or more of a skew value or a drift value during presentation of content by wireless devices. Once determined, the system may compensate to maintain synchronized presentation of content. Presentation may be considered synchronized if presentation of a particular sample or portion of content is presented by two or more devices within a threshold time of one another. For example, presentation may be synchronized when a particular sample of audio content from one presentation device is presented within 5 ms of another presentation device.

In one implementation a sensor may be used to detect the output produced by the presentation device, and directly measure one or more of skew or drift. For example, a microphone may be used to detect the sound produced by a Bluetooth speaker and determine a skew value. In another example, the microphone may be used to detect sound, which may be compared to the audio data sent to the Bluetooth speaker to determine a drift value.

In another implementation, the particular presentation device or a representative example may be tested, and one or more of the skew value or drift value determined and stored. During operation of the system, the content device may receive identifying information indicative of one or more of make, model, type, manufacturer, serial number, and so forth. Based on this information, previously determined information such as one or more of the skew value or drift value may be retrieved and used.

In some situations, direct measurement of skew and drift, or identifying information, may not available. For example, no microphone may be available to detect the sound, or the presentation device may not provide information such as a make or model. The drift may be determined based at least in part on an actual rate of data transfer per unit time from the content device to the presentation device. The actual rate of data transfer per unit time is determined. Residuals (or difference values) are determined based on a difference between an expected number of samples per unit time and the actual rate of data transfer per unit time. For example, the expected number of samples per unit time may be 44.1 k samples/second and the actual rate may be 43.93 k samples/second. The residual is 0.17 k samples/second. A plurality of residuals for several different time intervals may be determined. In one implementation, a linear regression function may be used to calculate a first regression line of the residuals. A slope of the first regression line is determined and used as the drift value. Continuing the example, the slope may be −0.17.

Once the drift value has been determined, the content data may be resampled to produce content with an adjusted number of samples per unit time. In one implementation, the adjusted number of samples per unit time may be determined by summing an additive inverse of the drift value to the expected number of samples per unit time. Continuing the example above, the drift value of −0.17 k samples/second indicates that the presentation of audio content is slower than expected, by a factor of approximately 0.00385. The additive inverse of the drift value is +0.17. The adjusted number of samples per second would be 44.1+0.17=44.27 k samples/second. The audio content with an expected transfer rate of 44.1 k samples/second may be resampled to the adjusted number of samples of 44.27 k samples/second that is then sent to the presentation device. The audio content that has been resampled to 44.27 k samples/second is transferred at an actual rate that is 0.00385 slower than the expected transfer rate, or approximately 44.1 k samples/second.

The drift value may change over time. For example, temperature changes may affect the onboard clock of the presentation device. The drift value may be determined periodically, as a moving average, upon occurrence of a trigger, and so forth. The system may continue to resample the content data to produce the adjusted number of samples per unit time.

Information about a current temperature of the ambient environment may be used to further compensate for drift. The content device may include a temperature sensor that produces temperature data. A current temperature value may be determined based on the temperature data, and a temperature correction factor may be retrieved. For example, if the current temperature value is 75 degrees Fahrenheit, a temperature correction factor of 0.007 may be retrieved. The adjusted number of samples per unit time may be multiplied by the temperature correction factor to further compensate for the temperature.

In some implementations the drift value may be used to retrieve a skew value. For example, an initial drift value, change in drift value over time, and so forth, may be used as an input that retrieves a skew value from previously stored data. For example, the drift value of −0.17 k samples/second may be used to lookup a skew value in a lookup table.

Once the skew value has been determined, presentation of the content may be synchronized by modifying presentation for at least the skew value. For example, audio content may be presented by a first presentation device and a second presentation device, each with a different skew value. A second presentation device exhibits a skew value of 100 ms, with respect to the first presentation device. In one implementation, the content may be sent to the first presentation device 100 ms after content is sent to the second presentation device. As a result of the delay, both the first presentation device and the second presentation device begin presentation at about the same time, synchronizing the beginning of the presentation of content. In another example, the content sent to the second presentation device may have 100 ms of content removed, discarded, omitted, and so forth. Combined with the techniques to determine and compensate for drift as described above, presentation of the content may remain synchronized over time.

In one implementation, presentation at other presentation devices may be delayed by prepending content data that does not result in perceptible presentation. For example, if the content data is audio data, "silent audio" or inaudible audio that comprises audio that is imperceptible or minimally perceptible may be produced. Continuing the example, the inaudible audio may comprise audio data that includes samples containing data and a zero amplitude. The inaudible audio may be inserted before the audio data that is to be presented to produce a delay. The inaudible audio is presented for a length of time specified by the skew value. In another implementation, sending of the content data may be delayed for the length of time specified by the skew value. In yet another implementation, a portion of the content data corresponding to the length of time specified by the skew value may be removed.

By using the techniques described in this disclosure, the system is able to maintain synchronization between a plurality of presentation devices. Skew and drift are compensated for, resulting in content presentation that is time synchronized within a threshold value. As a result, the intelligibility of the content being presented is improved. Additionally, the techniques allow for maintaining synchronization in an environment in which detection of the content as presented may not be possible, such as when microphones or cameras have been turned off by the user.

FIG. 1 illustrates a system 100 that determines and compensates for one or more of drift or skew. The system may be used to synchronize output from a plurality of presentation devices, according to one implementation.

A content server 102 provides content 104 to a content device 106. The content server 102 may be accessed via a WAN, such as the internet. The content 104 may comprise audio, video, an executable application, text, home automation control instructions, robot control instructions, and so forth. For example, the content 104 may comprise digitized audio.

The content devices 106 may connect to one or more access points 108 via a first wireless protocol 110 to form a wireless local area network (WLAN). For example, content devices 106(1)-(2) are connected to the access point 108 in this illustration. In other examples, other quantities of content devices 106 may be present.

The devices may use the first wireless protocol 110 to communicate with one another, or with other resources such as the content server 102. In some implementations the first wireless protocol 110 may be WiFi. Other devices 112 may also connect to the one or more access points 108. For example, a laptop computer may connect to the access point 108.

The content devices 106 may allow a user to interact with content 104. For example, the content devices 106 may include network enabled speakers, appliances, home entertainment systems, televisions, and so forth. In some implementations the content devices 106 may include output devices such as displays, speakers, and so forth that may be used to present content. For example, the content device 106 may include a speaker that can be used to produce sound from the audio content 104.

One or more of the content devices 106 may use a second wireless protocol 114 to communicate with one or more presentation devices 116. The presentation devices 116 may include one or more output devices such as speakers, displays, haptic devices, printers, actuators, and so forth. For example, the content device 106 may use the second wireless protocol 114 to send the content 104 comprising audio data to an external speaker that produces sound 118. By way of illustration and not necessarily as a limitation, the content devices 106(1) and 116(2) are each shown connected to a single presentation device 116(1) and 116(2), respectively. In other implementations some content devices 106 may not be connected to presentation devices 116, or may be connected to more than one presentation device 116. For example, content device 106 may be connected to three presentation devices 116. The presentation devices 116 may have the same or different capabilities. For example, some presentation devices 116 may comprise speakers to provide sound 118, while other presentation devices 116 may comprise displays to present images.

The content devices 106 may be operated in unison with one another. For example, the content devices 106(1) and 106(2) and their associated presentation devices 116(1) and 116(2) may be arranged at different locations within a home of the user, and may be used to play the same content 104, such as music, throughout the home at the same time.

The content device 106 may include one or more hardware processor(s) 120 (processors) configured to execute one or more stored instructions. The processors 120 may include microcontrollers, systems on a chip (SoC), field programmable gate arrays, digital signal processors, graphic processing units, general processing units, and so forth.

The content device 106 may include one or more clocks 122. The clocks 122 may provide information indicative of date, time, ticks, and so forth. The one or more clocks 122 may be used to provide timing signals or data to other components of the content device 106 during operation. For example, a clock 122 may provide the timing signal that is used to determine when a sample of the content 104 is to be processed. Due to changes in temperature, manufacture, aging, and so forth, the timing provided by the clock 122 may vary over time. For example, the interval between successive "ticks" or smallest time increments measured by the clock 122 may not always be the same. For example, the time interval between a first tick and a second tick may differ from that between a fiftieth tick and a fifty-first tick. The interval between ticks may also vary from a standard. For example, a clock 122 that uses a quartz crystal may measure more or fewer ticks over a given time than the ticks measured by a highly stable clock such as an atomic clock.

The content device 106 may include memory 124 comprising one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 124 provides storage of computer-readable instructions, data structures, program modules, at least a portion of content 104, and other data for the operation of the content device 106. A few modules are shown stored in the memory 124, although the same functionality may alternatively be implemented in hardware, firmware, or as a SoC. The modules may comprise instructions, that may be executed at least in part by the one or more processors 120.

The content device 106 may include one or more input/output ("I/O") devices 126. The input devices 126 may include sensors such as microphones, cameras, temperature sensors, light sensors, and so forth. The output devices 126 may include lights, buzzers, speakers, display devices, and so forth. For clarity, other elements of the content device 106 are not shown.

The content device 106 includes one or more communication interfaces 128 to communicate with the content server 102, other content devices 106, presentation devices 116, other devices 112, and so forth. The communication interfaces 128 may include devices configured to couple to one or more networks, including WLANs, WANs, wireless WANs, and so forth. For example, the communication interfaces 128 may include devices compatible with Ethernet, WiFi, WiFi Direct, 3G, 4G, LTE, and so forth. The communication interfaces 128 may include devices configured to couple to one or more personal area networks (PANs), such as Bluetooth, Bluetooth Low Energy, ZigBee, Z-Wave, and so forth.

Different types of content devices 106 may have different capabilities. For example, some content devices 106 may have faster processors 120 than others, more memory 124, different configurations of communication interfaces 128, different software installed, and so forth.

Different types of presentation devices 116 may have different capabilities. For example, some presentation devices 116 may have faster processors 120 than others, more memory 124, different configurations of communication interfaces 128, different software installed, different digital to analog circuitry, different buffer sizes, and so forth.

In addition to these different capabilities, the content device 106, the presentation devices 106, and so forth, may be physically placed at different locations with respect to one another. For example, a first presentation device 116(1) may be in one corner of a room while second presentation device 116(2) is in another corner.

The content device 106 is in communication with the presentation device 116. For example, the first content device 106(1) may use the first wireless protocol 110, such as WiFi, to receive content 104 from the content server 102, and then use the second wireless protocol 114, such as Bluetooth, to send the content 104 to the first presentation device 116(1). The second content device 106(2) may receive content 104 from the content server 102 or the first content device 106(1) using the first wireless protocol 110, and sends the content 104 to the second presentation device 116(2) using the second wireless protocol 114.

The content 104 may be provided with a particular sample rate that is indicative of how many times the analog data has been measured per unit of time. For example, analog signals, such as an analog audio signal, may be digitized and represented as 44,100 samples per second, or 44.1 k samples/second. Individual samples may be represented with a particular bit depth or value. For example, each sample may be represented by 16 bits of data.

The content device 106 uses first content data 130 that is at a first sample rate. For example, the first content data 130 may be the content 104 that was received from the content server 102. The first content data 130 consists of data at the first sample rate, such as 44.1 k samples/second.

A content delivery module 132 is used to send data representative of the content 104 to one or more presentation devices 116. For example, the content delivery module 132 may use the communication interfaces 128 to send, using the second wireless protocol 114, portions of the content 104 to the presentation device 116. The content delivery module 132 may operate in conjunction with the following modules.

An expected number of samples per unit time 134 is determined. The expected number of samples per unit time 134 may comprise the sample rate of the first content data 130. In some implementations the content 104 received from the content server 102 at a delivered sample rate may be resampled to produce the first content data 130 with a different sample rate. For example, the content server 102 may provide content 104 samples at 64 k samples per second while the first content data 130 is at 44.1 k samples/second.

During operation, the content delivery module 132 determines an actual number of samples per unit time 136 that have been sent to the presentation device 116. For example, the content delivery module 132 may track samples or groups of samples to determine a rate of data transfer from the content device 106 to the presentation device. The rate at which data is transferred between the content device 106 and the presentation device 116 may vary over time. For example, the presentation device 116 may send the content device 106 instructions to pause data transfer, reduce the rate of data transfer, increase the rate of data transfer, and so forth. Continuing the example, if the presentation device 116 receives samples of content 104 more quickly than it can present, and has no additional memory 124 in which to buffer or store those samples, the presentation device 116 may send a command to the content device 106 to temporarily suspend sending data.

There may be short term variations in data transfer, such as initial transfers of samples with no corresponding presentation, such as described below with respect to skew. Likewise, transitory network congestion or other situations may result in short term variations in data transfer. However, it may be assumed that, over at least some minimum window of time, the sending of data from the content device 106 to the presentation device 116 will assume a steady state. For example, over a minimum window of time of ten seconds, the rate at which samples of the first content data 130 is sent from the content device 106 to the presentation device 116 will be such that new samples being sent will equal those samples being "consumed" and presented as sound 118.

During normal operation and if the presentation device 116 introduced no delay in presentation, the actual number of samples per unit time 136 would be equal to the expected number of samples per unit time 134. However, as described above, there may be timing differences between the clock 122 of the content device 106 and the clock 122 of the presentation device 116. Likewise, the clock 122 of one presentation device 116 may differ from another presentation device 116. Each presentation device 116 is following the timing of its clock 122 to determine when to present a sample. Because the clocks 122 are not synchronized, the presentation of a sample begins to diverge from a common time. For example, the first presentation device 116(1) may present a first sample at a first time, while the second presentation device 116(2) with a slightly slower clock 122 presents the second sample at a second time that is later than the first time.

Meanwhile, the content delivery module 132 of a content device 106 is providing the first content data 130 to the presentation device 116 at the actual number of samples per unit time 136, sending content as the presentation device 116 consumes it.

Over time, these differences in timing result in desynchronization of the presentation of content 104 by the presentation devices 116. As content presentation continues, the difference in timing accumulates, resulting in increased delay in presentation of the same sample by different presentation devices 116. This may manifest as echoes, reverberation, or other perceptible effects. These effects may impair consumption of the content 104 by the user. For example, as the echoes increase, the ability of the user to understand words in the content 104 is decreased.

A drift module 138 calculates a first set of residuals 140 based on the expected number of samples per unit time 134 and the actual number of samples per unit time 136. For example, each residual 140 may comprise a difference between the expected number of samples per unit time 134 for a particular interval of time and the actual number of samples per unit time 136 that were sent to the presentation device 116 during that particular interval.

A linear regression function may be used to calculate a first regression line using linear regression of the first set of residuals 140. A slope of the first regression line is representative of the trend as to whether the first content data 130 is being sent at the expected rate (a slope of 0), more quickly than expected (a positive slope), or more slowly than expected (a negative slope). A drift value 142 is determined based on the sign and slope of the first regression line.

The drift module 138 may determine the drift value 142 at one or more times. For example, the drift module 138 may determine the drift value 142 at specified intervals, during initial pairing between the content device 106 and the presentation device 116, and so forth.

In some implementations the drift module 138 may store the drift value 142 and associate the drift value 142 with identifying data such as the media access control value for the presentation device 116, a serial number of the presentation device 116, and so forth. At a later time, based on the identifying data, the drift value 142 may be retrieved and subsequently used.

In some implementations the first content data 130 may comprise content that is intended for presentation, such as audio data that produces sound 118 audible to the user. In other implementations the first content data 130 may comprise content that is imperceptible to the user. For example, inaudible audio may comprise audio data that represents sounds but has amplitude values that are close or equal to zero, such that when presented by the presentation device 116 it is imperceptible to the user.

A resampling module 144 uses the drift value 142 to determine an adjusted number of samples per unit time 146. In one implementation, the adjusted number of samples per unit time 146 may be determined by summing an additive inverse of the drift value 142 to the expected number of samples per unit time 134. For example, if the drift value 142 is −0.37 k samples/second and the expected number of samples per unit time 134 is 44.1 k samples/second, the adjusted number of samples per unit time 146 would be calculated as 44.1+0.37=44.47 k samples/second.

Once determined, the resampling module 144 may resample content 104 from a first sample rate to a second sample rate, prior to sending to the presentation device 116. The now-resampled content 104 is then sent to the presentation device 116. The presentation device 116 may then proceed to presenting the content 104. Assuming the drift value 142 of the presentation device 116 does not change beyond a threshold value, the resampled content 104 at the second sample rate is affected by the drift, resulting in the actual content 104 being presented with timing that is approximately corrected for the drift. For example, if the presentation device 116 has a clock 122 that is running slow, it presents fewer samples per second than expected. The resampling module 144 resamples the content 104 to a higher sampling rate, sending more samples per second of the content 104. The presentation device 116, because of its slow clock, takes longer to present the content 104. The higher sampling rate approximately cancels out the expected delay in presentation due to the drift. As a result, the actual sound 118 produced by the presentation device 116 is being presented, within a threshold value, of the time expected. As other presentation devices 116 are synchronized to begin presentation at the approximately the same time, the resulting sound 118 from the plurality of presentation devices 116 remains time synchronized.

The resampling module 144 may use one or more resampling techniques to resample the content 104. In one implementation, resampling may comprise determining that accumulated drift has reached a threshold value and then adding or removing a delay between samples to compensate for the accumulated drift value. For example, if the drift value 142 is 100 parts per million or 100 microseconds per second, after 100 seconds of content 104 being presented now leads (is in advance of) by 10,000 microseconds (10 ms). If the threshold is 9 ms, the resampling may comprise realigning presentation by removing 9 ms of content.

In another implementation, resampling may comprise adding or dropping one or more samples when the drift value 142 exceeds a threshold value associated with a single sample. A sample may be added by duplicating a sample.

In yet another implementation, resampling may utilize one or more interpolation techniques. For example, a Lanczos resampling technique may be used to process audio samples by interpolating values and generating output with a desired sample rate. In another example, the resampling may utilize linear or non-linear interpolation.

A skew module 148 may be used to determine the skew value 150 of a particular presentation device 116. The skew value 150 is indicative of a time difference between presentation of the same, or an equivalent, sample by different presentation devices 116. In some implementations the skew value 150 may be indicative of a time difference with respect to a specified timing source. For example, a skew value 150 indicative of an initial skew may comprise the time between when presentation of content 104 is sent to the presentation device 116 and when actual output of the content 104, such as sound 118, is produced. For example, a skew value 150 of 97 milliseconds (ms) would indicate that there is a delay of 97 ms between when the content device 106 sends content 104 and the time when the presentation device 116 begins playing that sound 118 from its speaker. In another example, a skew value 150 of 9 ms may indicate that there is a time difference of 9 ms between presentation by the first presentation device 116(1) and the second presentation device 116(2).

The skew module 148 may determine the skew value 150 using one or more techniques. One technique for determining the initial skew involves direct measurement, with input being obtained by a microphone that is within a threshold distance of the presentation device 116. For example, a content device 106 may be positioned adjacent to the presentation device 116. A microphone in the content device 106 listens for the sound 118 being produced. By measuring the time between when the content 104 was sent to the presentation device 116 and when the sound 118 was detected, the skew value 150 may be measured.

Another technique retrieves a previously stored skew value 150 based on information about the presentation device 116. For example, if identifying information such as a device make and model can be obtained, this data may be used to retrieve the skew value 150 associated with that particular make and model.

In some implementations, the skew value 150 may be provided. For example, during setup of the system the user may use a control in a user interface to adjust the skew value 150 until presentation of the content 104 is synchronized, as perceived by the user.

In some situations, the presentation device 116 may be unable to provide identifying information to the content device 106, or the identifying information may be deemed unreliable. Another technique may utilize the drift value 142 to retrieve a previously stored skew value 150. For example, given the drift value 142 of −0.37 k samples/second, a skew value 150 indicative of an initial skew of 97 ms may be retrieved from a lookup table or other data structure. In some implementations, several drift values 142 obtained at different times may be used to generate a signature that is then used to retrieve a skew value 150.

In yet another technique, a change in drift value 142 over time may be determined and used to retrieve the previously stored skew value 150. For example, drift values 142 that exhibit changes of −0.37, −0.41, −0.27 as determined at three successive times may be used as a "signature" to retrieve the stored skew value 150. In some implementations the retrieval may be based on a tolerance or range, such as finding the skew value 150 associated with the drift value 142 plus or minus 10%. In other implementations one or more pattern matching or recognition techniques may be used. For example, a fuzzy logic matching algorithm, neural network, or other techniques may be used to determine if there is a correspondence between one or more drift values 142 or change in drive values and a stored skew value 150.

The content delivery module 132 may use the skew value 150 to determine whether to introduce a delay or truncate samples in the presentation of the content 104 by the presentation device 116. The content delivery module 132 may use skew values 150 from other content devices 106 as well to determine whether to introduce a delay or drop one or more samples. For example, audio content may be presented by a first presentation device 116(1) and a second presentation device 116(2), each with a different skew value 150. Continuing the example, the first presentation device 116(1) may have an initial skew value 150(1) of 60 ms, while a second presentation device 116(2) has an initial skew value 150(2) of 100 ms. The content delivery module 132 may determine the greatest (longest) skew value 150 of the presentation devices 116, in this example, 100 ms. In implementations where the content delivery module 132 is unable to reduce a skew value 150, the presentation of content 104 may be delayed such that the presentation devices 116 begin presentation at approximately the same time, or some portion of the content 104 may be truncated, removed, dropped, and so forth. Continuing the example, the content 104 is sent to the first presentation device 116(1) 40 ms after content 104 is sent to the second presentation device 116(2). By introducing the delay to the first presentation device 116(1), presentation by both presentation devices 116 begins at about the same time.

The content delivery module 132 may send second content data 152 to the presentation device 116. The second content data 152 may include inaudible audio, content 104 that is imperceptible to the user, or other content to introduce a delay based on the skew value 150. The second content data 152 may comprise content 104 resampled at the adjusted number of samples per unit time 146 by the resampling module 144, to compensate for drift.

The second content data 152 may be sent by the content device 106 to the presentation device 116 using the second wireless protocol 114. In some implementations, the content device 106 and the presentation device 116 may use the first wireless protocol 110 to send one or more of the first content data 130, the second content data 152, and so forth.

The presentation device 116 includes one or more components, including one or more processors 120, clocks 120, memories 124, I/O devices 126, communication interfaces 128, and so forth. The presentation device 116 may also include a content presentation module 154. The content presentation module 154 may accept content 104, such as the first content data 130, second content data 152, and so forth, and present the content 118 using one or more output devices of the I/O devices 126. For example, the content presentation module 154 may include a hardware codec that accepts the content 104 and generates an analog signal that is amplified and used to drive a loudspeaker.

In some implementations one of the content devices 106 may act as a master device, coordinating the collection of the skew values 150 from content devices 106 and their associated presentation devices 116 that are participating in presentation of content 104. For example, the master device may gather the skew values 150 from the respective content devices 106, determine the longest skew value 150, and then determine adjusted skew values 150 for each content device 106 to use when sending content 104 to the presentation devices 116. In other implementations, a server, such as the content server 102 may perform these functions.

The determination of drift value 142 and skew value 150 may be with respect to the master device. For example, the master device may be designated as being a "time master" and the drift value 142 and the skew value 150 may be determined relative to the operation of that master device. Continuing the example, if the content device 106(1) is the master device, it may exhibit a drift value 142 of 0 and a skew value 150 of 0, while the content device 106(2) exhibits a drift value 142 and a skew value 150 that are relative to the master device.

Figure 2:
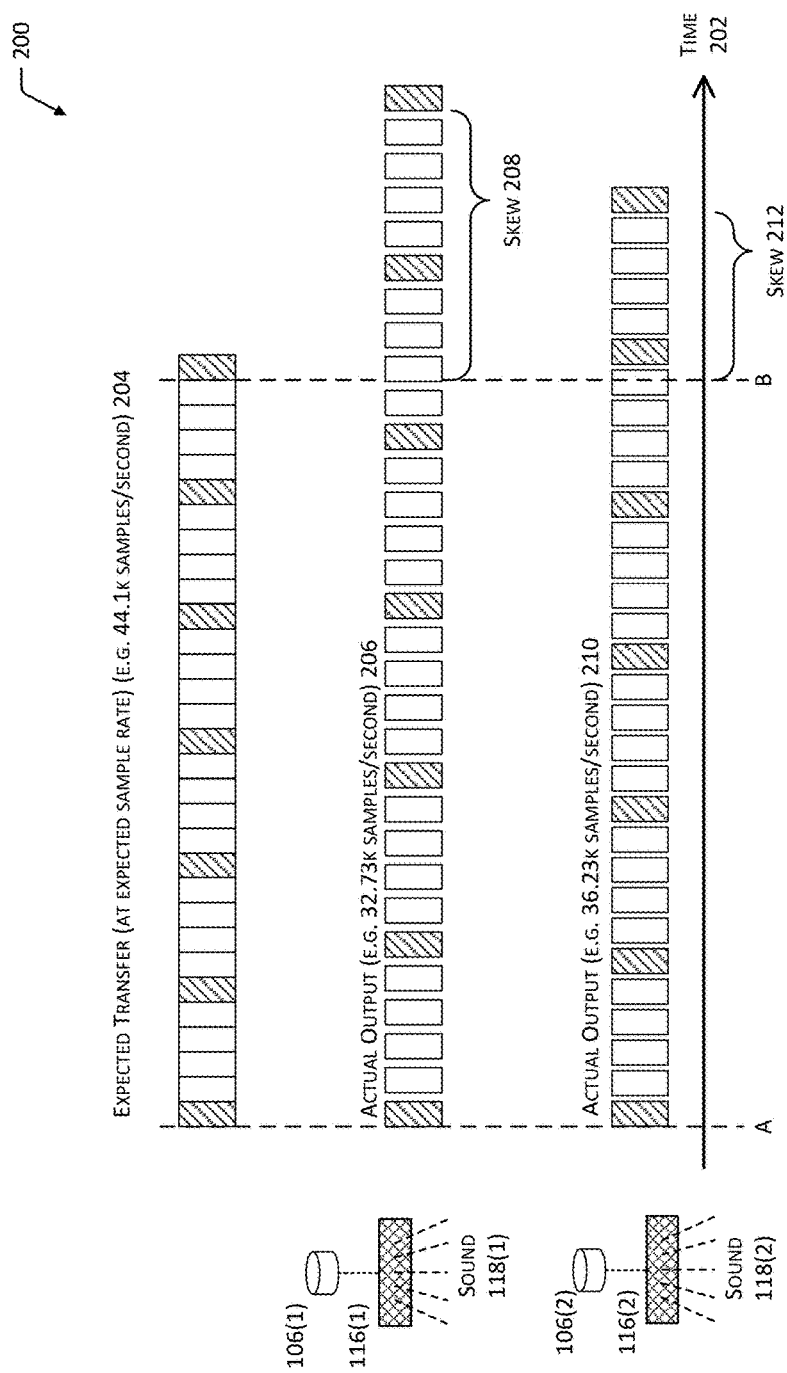
FIG. 2 is an illustration of skew resulting from a variance between an expected transfer rate and the actual transfer rates of content between audio devices and presentation devices, according to one implementation.

FIG. 2 is an illustration 200 of skew resulting from a variance between an expected transfer rate and the actual transfer rates of content between audio devices and presentation devices, according to one implementation. In this illustration time 202 is indicated as increasing from left to right. Depicted is an expected transfer 204 at the expected number of samples per unit time 134, with the rectangles representing individual samples of content 104. The portion of the expected transfer 204 extends from time "A" to time "B". Shaded rectangles represent a start of a particular group of samples.

In this illustration, an actual output 206 is depicted of the samples from the first content device 106(1) to the first presentation device 116(1). The actual output 206 is representative of the actual transfer of content 104 from the content device 106 to the presentation device 116 over some period of time. The transfer of content 104 from the content device 106 to the presentation device 116 via the second wireless protocol 114 may be "bursty", such as when a group of samples are sent together, followed by a pause, then another group of samples. The first presentation device 116(1) then uses the samples to present sound 118(1) on a regular basis that may be regulated by an internal clock of the first presentation device 116(1), producing the actual output 206. For example, the actual transfer of content 104 may comprise an average of the number of samples that are sent to the presentation device 116 over a time interval that may include one or more bursts of traffic.

As described above, different presentation devices 116 may present content 104 at slightly different rates due to drift, with the result being some content 104 being presented earlier or later when compared to the expected transfer 204. Because of the interaction between the presentation device 116 and the content device 106, such as the presentation device 116 sending the content device 106 data about whether to increase or decrease data transfer, it may be assumed that the presentation device 116 receives samples at about the rate of consumption (presentation).

Returning to the illustration, the actual output 206 indicates that samples are being sent more slowly than expected to the presentation device 116(2), and thus are presumed as being presented more slowly by the presentation device 116, compared to the expected transfer 204, resulting in a skew 208. In this illustration, the actual output 206 is a result of an actual transfer of the content 104 from the first content device 106(1) to the first presentation device 116(1) at 32.73 k samples/second.

Also illustrated is an actual output 210 from the second content device 106(2) to the second presentation device 116(2). In this illustration, the actual output 210 is a result of an actual transfer of the content 104 of 36.23 k samples/second and a skew 212 between the expected transfer 204 and the actual output 210 is shown. As illustrated, the actual output 206 diverges over time from the actual output 210.

The actual outputs are produced from transfer rates that express a quantity of data transferred per unit time, and may be expressed as a number of samples per second. Individual samples or groups of samples may be sent at different times. For example, instead of sending each sample at a discrete time, groups of samples may be sent, interspersed with times during which no samples are sent. In some implementations, the transfer rate may be an average rate at which samples are transferred, with the average taken over a time interval that is greater than the time spent transmitting a burst of samples via the second wireless protocol 114. The relative arrangement of samples is thus provided by way of illustration, and not necessarily as a limitation.

Figure 3:
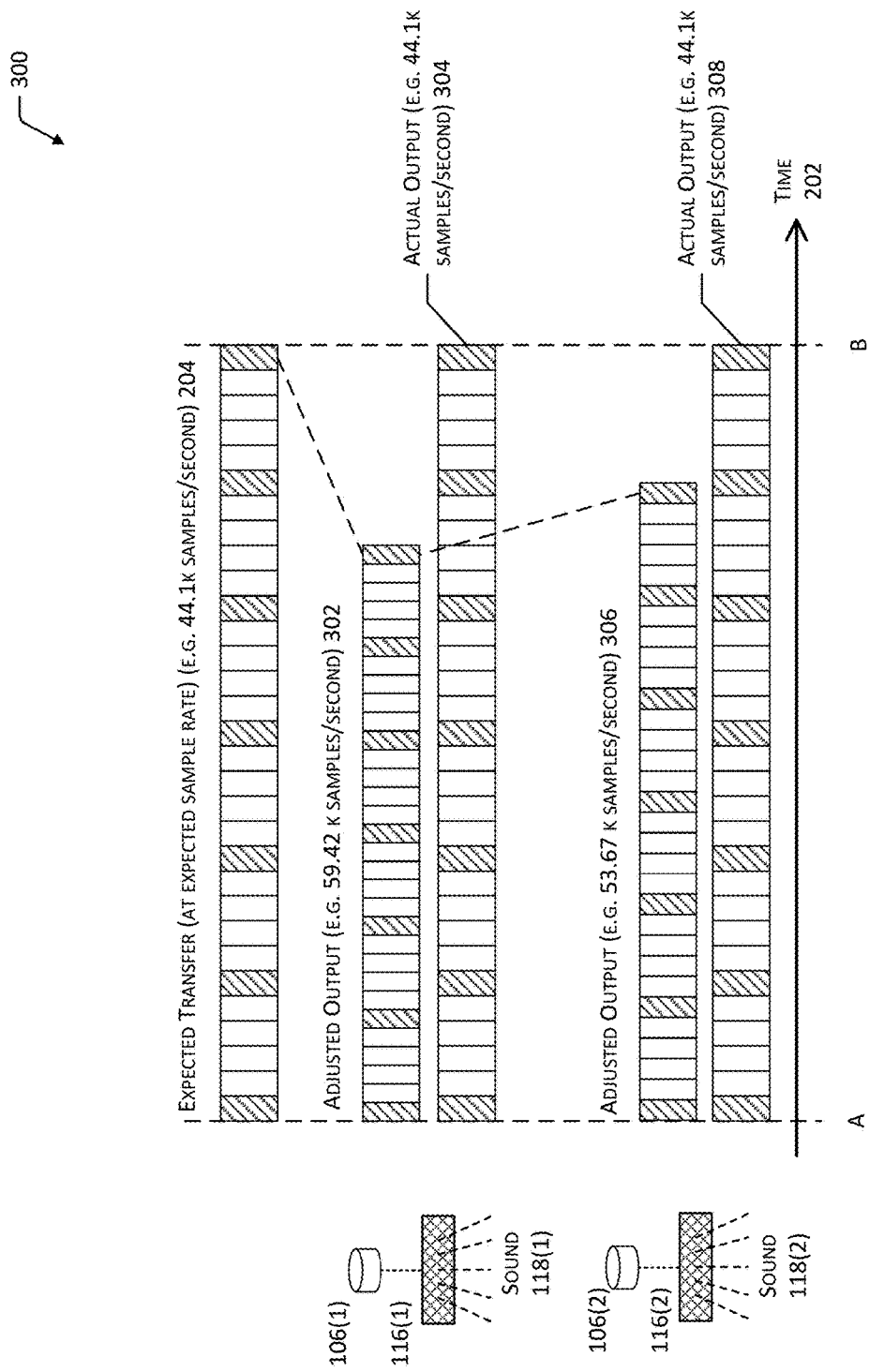
FIG. 3 is an illustration of resampling of content to compensate for drift of presentation devices, according to one implementation.

FIG. 3 is an illustration 300 of resampling of content 104 to compensate for drift 104 of presentation devices 116, according to one implementation. As with FIG. 2, in this illustration the time 202 is indicated as increasing from left to right. Depicted is the expected transfer 204. The portion of the expected transfer 204 extends from time "A" to time "B". Shaded rectangles represent a start of a particular group of samples.

As described above, the drift value 142 may be used to determine the adjusted number of samples per unit time 146 to be used when sending the content 104 to a particular presentation device 116. In this illustration, the first content device 106(1) has used its resampling module 144 to resample the content 104 from 44.1 k samples/second to 59.42 k samples/second and produce an adjusted transfer in which samples are sent more quickly, producing an adjusted output 302. The first presentation device 118(1) introduces the drift shown above, effectively slowing down the presentation, resulting in an actual output 304 of about the expected transfer 204.

Similarly, the second content device 106(2) has resampled the content 104 from 44.1 k samples/second to 53.76 k samples/second to produce adjusted transfer that provides for an adjusted output 306. The second presentation device 118(2) introduces the drift shown above, effectively slowing down the presentation, resulting in an actual output 308 of about the expected transfer 204.

Figure 4:
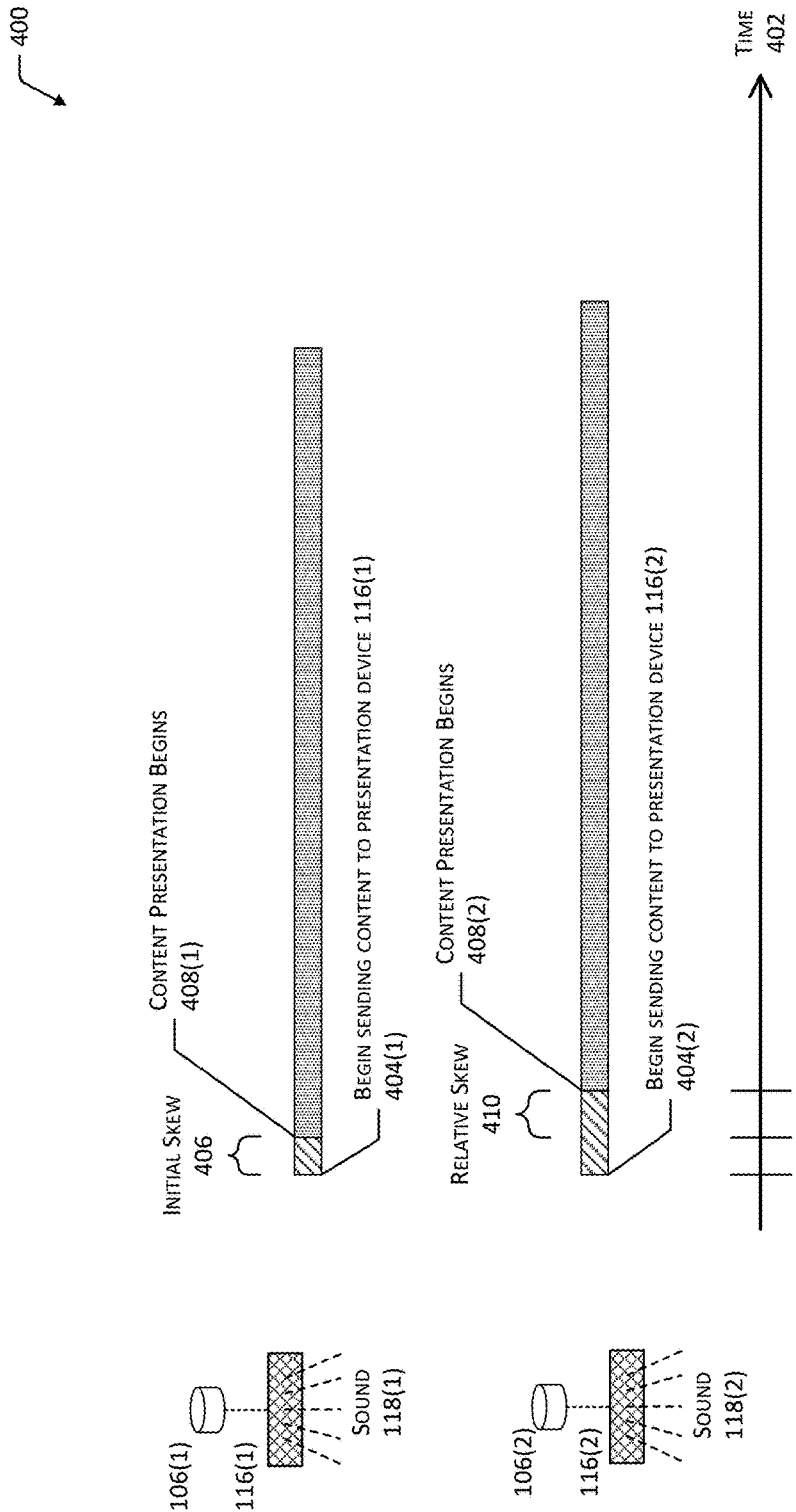
FIG. 4 is an illustration of skew in the presentation of content by presentation devices, according to one implementation.

FIG. 4 is an illustration 400 of skew in the presentation of content 104 by presentation devices 116, according to one implementation. As in FIGS. 2 and 3, the first content device 106(1) that sends content 104 to the first presentation device 116(1) and the second content device 106(2) that sends content 104 to the second presentation device 116(2) are shown.

Time 402 is indicated as increasing from left to right. At time "A" as shown at 404, the content devices 106 begin sending content 104 to their respective presentation devices 116. However, as a result of initial skew 406, the time 402 at which content presentation begins is not the same for the presentation devices 116 shown here. The initial skew 406 comprises the amount of time that passes between when the content device 106 begins sending content to a presentation device 404 and when the content presentation begins 408. For example, the content device 106(1) begins sending content 104 to the presentation device 116(1) at time "A", but content presentation does not begin at the first presentation device 116(1) until time "B". Continuing the example, the content device 106(2) begins sending content 104 to the presentation device 116(2) at time "A" but content presentation does not begin at the second presentation device 116(2) until time "C".

A relative skew 410 is indicative of a difference in time between when the content presentation begins at 408(1) by the first presentation device 116(1) that is being sent content 104 by the first content device 106(1) that is acting as a time master, and when the content presentation begins 408(2) at the second presentation device 116(2).

As a result, presentation of content 104 as shown here is not time synchronized. As described above, the skew module 148 may determine the skew value 150 that is used to synchronize when content presentation begins 408. Continuing the example, the content 104 provided by the first content device 106(1) to the first presentation device 116(1) may be delayed by the amount indicated by the relative skew 410 to prevent presentation until time "C". In another example, the content 104 provided by the second content device 106(2) to the second presentation device 116(2) may be truncated by the amount indicated by the relative skew 410, in effect "forwarding" or "advancing" the content 104 presented by the second presentation device 116(2) so that as presentation begins at time "C", the presented content is synchronized with the content presentation by the first presentation device 116(1).

Figure 5:
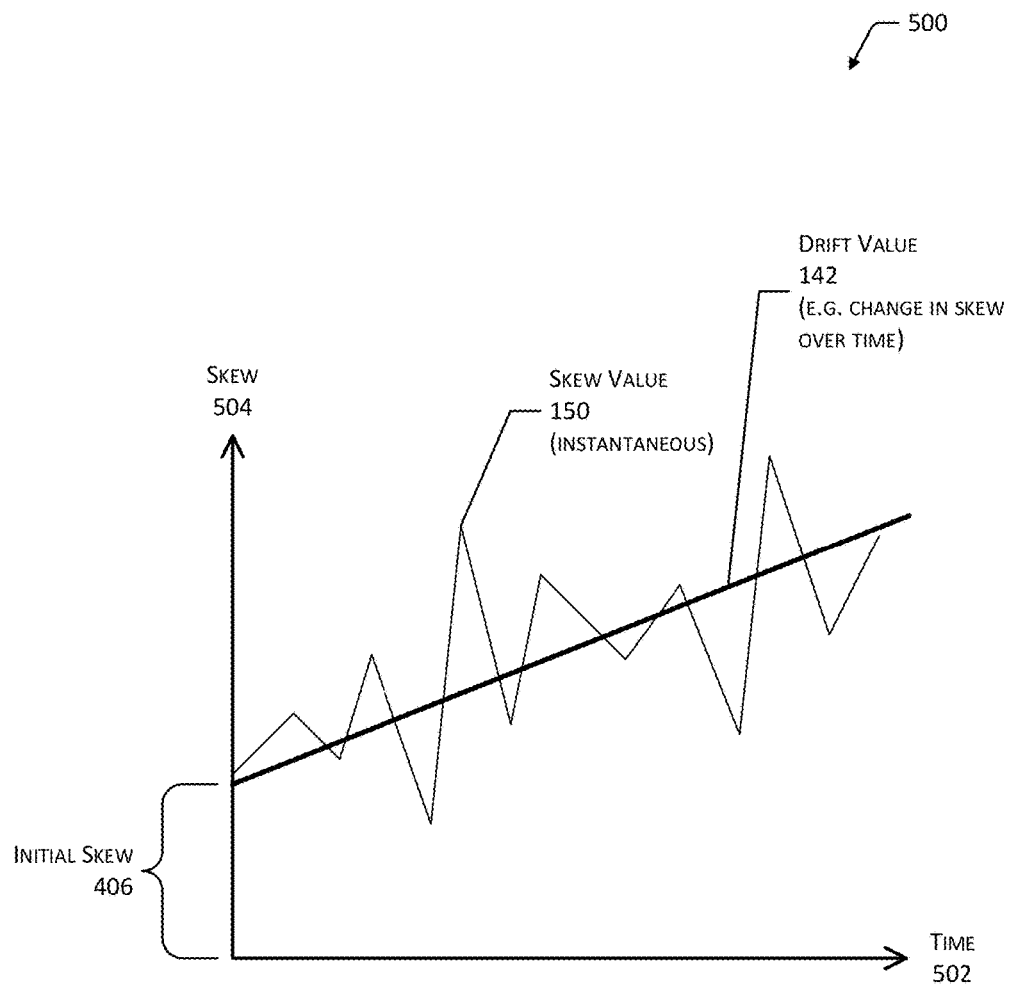
FIG. 5 illustrates a graph showing skew and drift, according to one implementation.

FIG. 5 illustrates a graph 500 showing skew and drift, according to one implementation. In this illustration, time 502 is indicated as increasing from left to right along a horizontal axis while skew 504 is indicated as increasing from bottom to top. As presentation begins, the initial skew 406 occurs due to delays in presentation. In some implementations instead of the initial skew 406, a relative skew 410 may be indicated.

As time 502 progresses, the skew values 150 may vary from time to time. A drift value 142 may comprise a slope of a line that is based on the skew values 150. For example, the drift value 142 may comprise the slope of a line produced by a linear regression of the skew values 150.

In other implementations, other techniques may be used, including but not limited to a moving average function, low pass filter function, and so forth. For example, a plurality of moving average values may be determined from the plurality of difference values. These moving average values may be used to determine the drift value 142. For example, a slope of a line through the moving average values may be used to determine the drift value 142. The moving average may comprise a simple moving average, a cumulative moving average, a weighted moving average, and exponential moving average, and so forth.

As described above, the skew values 150 may be indicative of a variance in timing with respect to a reference clock, timing source, or another device of a sample or portion thereof. For example, the skew value 150 may indicate a difference in when a first presentation device 116(1) and a second presentation device 116(2) presented the same sample (or an equivalent sample, such produced by resampling).

The skew and drift may vary for different devices, different firmware implementations, different software configurations, manufacturing lots, environmental factors, and so forth. For example, the drift value 142 for one pairing of a content device 106 and a presentation device 116 may differ from the drift value 142 of another.

Figure 6:
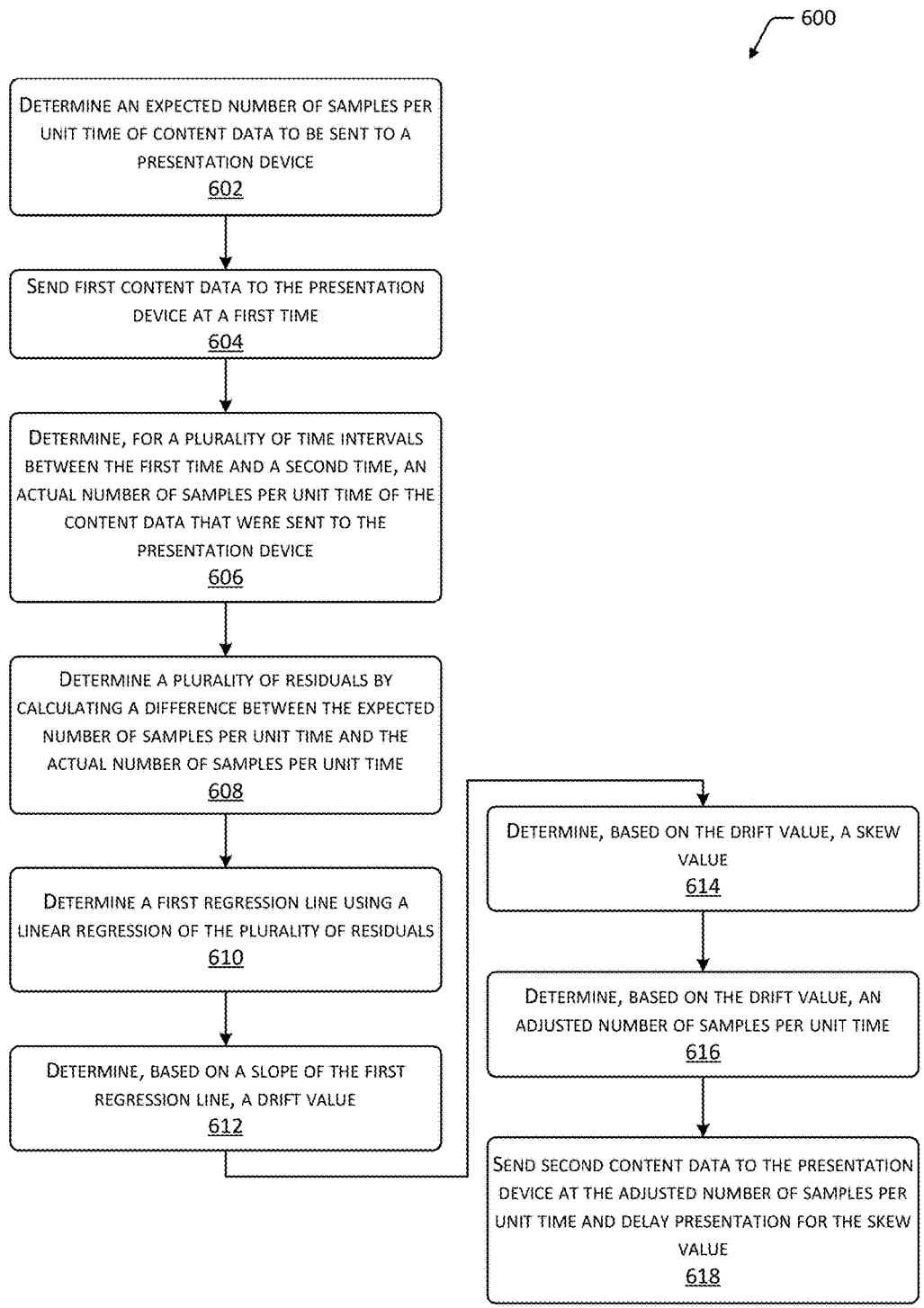
FIG. 6 is a flow diagram illustrating a method for determining drift and skew, according to one implementation.

FIG. 6 is a flow diagram 600 illustrating a method for determining drift and skew, according to one implementation. In some implementations the method may be performed at least in part by the content device 106.

At 602 an expected number of samples per unit time 134 to be sent to a presentation device 116 is determined. For example, the sample rate of the content 104 provided by the content server 102 may be used as the expected number of samples per unit time 134.

At 604, first content data 130 is sent to the presentation device 116 at a first time. For example, the first content data 130 may comprise first audio data that is sent to a first wireless speaker using the Bluetooth protocol. In some implementations the first content data 130 may comprise content 104 that, when presented by the output device(s) of the presentation device 116, is inaudible or imperceptible. For example, the first audio data may be inaudible when presented by the first wireless speaker.

At 606, for a plurality of time intervals between the first time and a second time, an actual number of samples per unit time 136 of the first content data 130 sent to the presentation device 116 is determined. For example, entry and exit times of one or more of the samples to a transmit buffer of the content delivery module 132 may be used to determine the actual number 136 for individual ones of at least some of the plurality of time intervals.

At 608 a plurality of residuals are determined by calculating a difference between the expected number of samples per unit time 134 and the actual number of samples per unit time 136. For example, a difference value may be calculated by subtracting the actual number of samples per unit time 136 from the expected number of samples per unit time 134 for one of the time intervals. This may be repeated to produce a plurality of difference values.

At 610 a first regression line using a linear regression of the plurality of residuals is determined. For example, a linear regression module may use a linear regression function to calculate the first regression line. In other implementations, other techniques may be used to determine a representation of a change over time of the plurality of difference values.

At 612 a drift value 142 is determined based on a slope of the first regression line. For example, the slope of the first regression line may be used as the drift value 142.

In other implementations other techniques may be used to determine the drift value 142. For example, a moving average function, a low pass filter function, finite impulse response filter, and so forth may be used to process the residuals or other values to determine the drift value 142.

In some implementations, at 614 the skew value 150 may be retrieved based on the drift value 142. For example, a set of drift values 142 may be determined over some period of time. The set of drift values 142 may be compared with signatures representative of previously stored drift values. A particular signature of drift values that has been previously stored may be associated with a particular skew value 150. If the set of drift values 142 has a correspondence with a signature of drift values, and that correspondence exceeds a threshold value, the associated skew value 150 may be retrieved.

At 616, based on the drift value 142, an adjusted number of samples per unit time 146 is determined. For example, the adjusted number of samples per unit time 146 may be calculated by summing an additive inverse of the drift value 142 and the expected number of samples per unit time 134.

At 618 second content data 152 is sent to the presentation device 116 at the adjusted number of samples per unit time 146. If a non-zero skew value 150 is determined, the transmission of the second content data 152 may be delayed, content 104 such as inaudible audio may be sent to produce the desired delay, and so forth.

Figure 7:
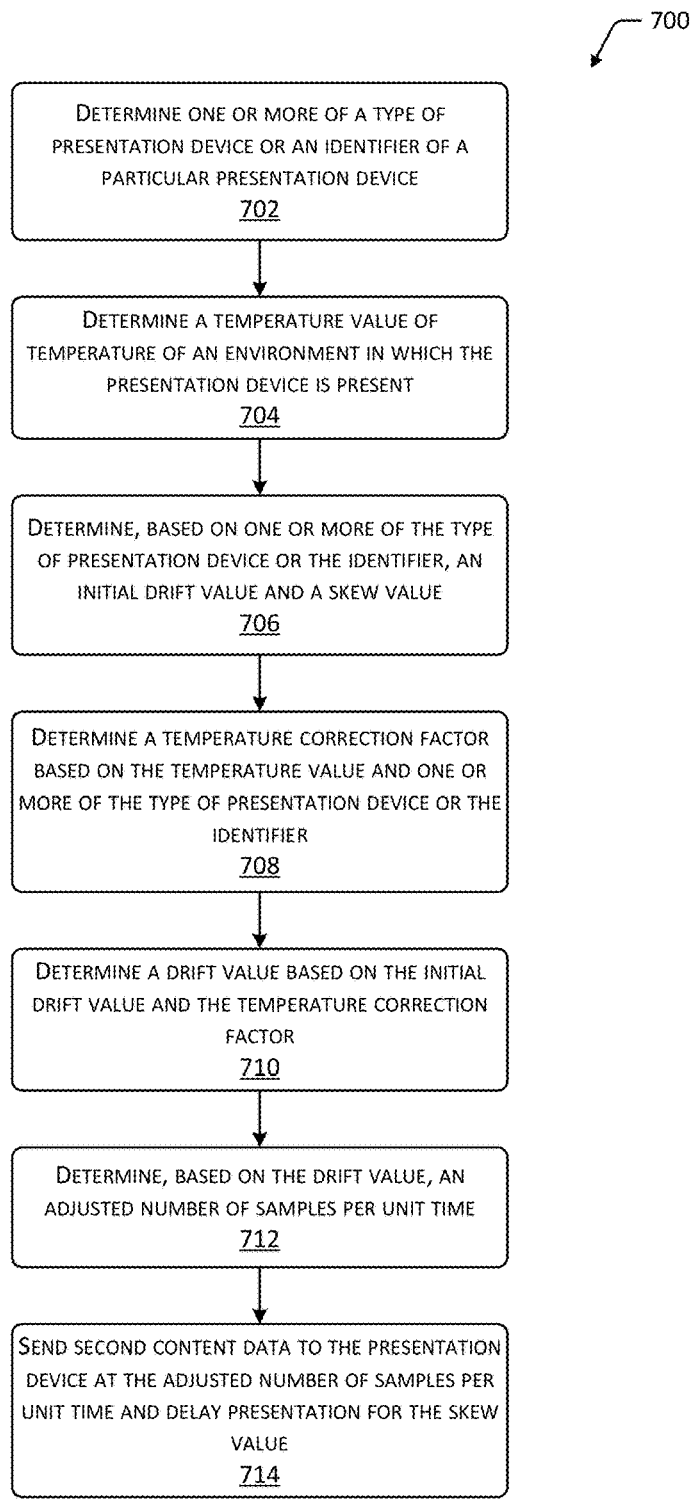
FIG. 7 is a flow diagram illustrating a method for adjusting drift to compensate for temperature changes, according to one implementation.

FIG. 7 is a flow diagram 700 illustrating a method for adjusting drift to compensate for temperature changes, according to one implementation. In some implementations the method may be performed at least in part by the content device 106.

At 702 identifying information is obtained about the presentation device 116. For example, one or more of a type of presentation device 116, serial number, make, model, and so forth may be received from the presentation device 116 via the second wireless protocol 114.

At 704 a temperature value of the temperature of the environment in which the presentation device is present is determined. For example, one or more of the content device 106, presentation device 116, home environmental control system, smartphone, or other device in the environment may have a temperature sensor that can produce the temperature value.

At 706 an initial drift value is determined. In one implementation, the drift value 142 may be determined by the drift module 138 as described above. In another implementation, the initial drift value may be retrieved using the identifying information. A skew value 150 may also be determined as described above, retrieved using identifying information, and so forth.

At 708 a temperature correction factor is determined based on the temperature value and the identifying information. For example, given a particular make and model of the presentation device 116 and temperature in the environment, a temperature correction factor is retrieved from previously stored data. In some implementations the temperature correction factor may be calculated.

At 710 the drift value 142 to be used by the content device 106 is determined based on the initial drift value and the temperature correction factor. For example, the initial drift value may be multiplied by the temperature correction factor to determine the drift value.

At 712, based on the drift value 142, an adjusted number of samples per unit time 146 is determined. For example, the resampling module 144 may be used to resample the content 104 at the adjusted number of samples per unit time 146.

At 714 second content data 152 is sent to the presentation device 116 at the adjusted number of samples per unit time 146.

The methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Further-more, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A first audio device comprising:
a first wireless local area network (WLAN) interface;
a first Bluetooth interface coupled to a first wireless speaker;
a first memory storing first computer-executable instructions;
a first hardware processor to execute the first computer-executable instructions to:
    determine an expected number of samples of audio data per unit time;
    send, at a first time, first audio data to the first wireless speaker, wherein the first audio data is sampled at a first sample rate;
    determine, for a plurality of time intervals between the first time and a second time, an actual number of samples of the first audio data sent per unit time to the first wireless speaker;
    determine, for a portion of the plurality of time intervals, a first set of residuals by calculating a difference between the expected number of samples per unit time and the actual number of samples sent per unit time for a particular one of the portion of the plurality of time intervals;
    determine a first regression line using a linear regression of the first set of residuals;
    determine, based on a slope of the first regression line, a drift value;
    retrieve, based on the drift value, a skew value from previously stored data, wherein the skew value is indicative of an initial delay between sending audio data to the first wireless speaker and output of corresponding audio by the first wireless speaker;
    determine an adjusted number of samples per unit time by summing an additive inverse of the drift value to the expected number of samples per unit time; and
    send, at a third time to the first wireless speaker, second audio data that includes a presentation delay with a length of the skew value and wherein the second audio data is sent at the adjusted number of samples per unit time.

2. The first audio device of claim 1, the first audio device further comprising:
a temperature sensor to produce temperature data; and
wherein the first hardware processor further executes the first computer-executable instructions to:
    determine a current temperature value based on the temperature data;
    retrieve, based on the current temperature value, a temperature correction factor that is previously stored; and
    wherein the adjusted number of samples per unit time is further determined by multiplying a sum of the drift value and the first sample rate by the temperature correction factor.

3. A computer-implemented method comprising:
determining an expected number of samples of audio data per unit time;
sending first audio data to a first wireless speaker at a first time;
determining, for a plurality of time intervals that occur between the first time and a second time, a first number of samples of the first audio data sent per unit time to the first wireless speaker within respective ones of the time intervals;
determining a plurality of difference values between the expected number of samples per unit time and the first number of samples per unit time for the respective ones of the time intervals;
determining, based at least in part on one or more of the plurality of difference values, a drift value;
determining, based on the drift value, a second number of samples per unit time;
resampling second audio data at the second number of samples per unit time to generate modified second audio data; and
sending the modified second audio data to the first wireless speaker.

4. The computer-implemented method of claim 3, the determining the drift value comprising:
determining a first regression line using a linear regression of the plurality of difference values; and
determining, based on a slope of the first regression line, a drift value.

5. The computer-implemented method of claim 3, the determining the drift value comprising:
determining a plurality of moving average values from the plurality of difference values; and determining, based on the plurality of moving average values, a drift value.

6. The computer-implemented method of claim 3, the determining the second number of samples per unit time comprising:
summing an additive inverse of the drift value and the expected number of samples per unit time.

7. The computer-implemented method of claim 3, wherein the first audio data is inaudible.

8. The computer-implemented method of claim 3, further comprising:
determining a plurality of drift values;
retrieving, based on a correspondence between the plurality of drift values and a signature based on previously stored drift values, a skew value from previously stored data.

9. The computer-implemented method of claim 3, further comprising:
determining a temperature value indicative of a temperature of an environment in which the first wireless speaker is present;
retrieving a temperature coefficient based on the temperature value, wherein the temperature coefficient is indicative of a variation in operation of a clock of the first wireless speaker due to changes in temperature; and
wherein the determining the drift value further comprises multiplying a slope of a first regression line by the temperature coefficient.

10. The computer-implemented method of claim 3, further comprising:
determining an accumulated total drift based on the drift value and one or more of:
elapsed time of sending the modified second audio data, or
total quantity of the modified second audio data sent;
determining the accumulated total drift exceeds a threshold value; and
discontinuing the sending of the modified second audio data.

11. A computer-implemented method comprising:
determining an expected number of samples of content per unit time;
sending first content data from a first device to a second device at a first time;
determining, for a plurality of time intervals that occur between the first time and a second time, a first number of samples of the first content data sent per unit time to the second device within respective ones of the time intervals;
determining a plurality of difference values by calculating a difference between the expected number of samples per unit time and the first number of samples per unit time;
determining, based on at least a portion of the plurality of difference values, a drift value;
determining, based on the drift value, a second number of samples per unit time; and
sending second content data from the first device to the second device at the second number of samples per unit time.

12. The computer-implemented method of claim 11, further comprising:
sending the first content data and the second content data from the first device to the second device using a wireless protocol; and
wherein the first content data and the second content data comprise one or more of:
audio data,
video data, or
control data to direct operation of a robot.

13. The computer-implemented method of claim 11, the determining the drift value comprising:
determining a first regression line using a linear regression of the plurality of difference values; and
determining, based on a slope of the first regression line, the drift value.

14. The computer-implemented method of claim 11, the determining the drift value comprising:
determining a plurality of moving average values from the plurality of difference values; and
determining, based on the plurality of moving average values, a drift value.

15. The computer-implemented method of claim 12, the determining the second number of samples per unit time comprising:
summing an additive inverse of the drift value and the expected number of samples per unit time.

16. The computer-implemented method of claim 11, wherein the first content data is imperceptible when presented by the second device.

17. The computer-implemented method of claim 11, further comprising:
resampling third content data at the second number of samples per unit time to generate second audio data.

18. The computer-implemented method of claim 11, further comprising:
determining a plurality of drift values; and
retrieving, based on the plurality of drift values, a skew value from previously stored data.

19. The computer-implemented method of claim 11, further comprising:
determining a temperature value indicative of a temperature of an environment in which the first device is present;
retrieving a temperature coefficient based on the temperature value, wherein the temperature coefficient is indicative of a variation in operation of a clock of the second device due to changes in temperature; and
wherein the determining the drift value is based at least in part on the temperature coefficient.

20. The computer-implemented method of claim 11, further comprising:
determining an accumulated total drift based on the drift value and one or more of:
elapsed time of sending the second content data, or
total quantity of the second content data sent;
determining the accumulated total drift exceeds a threshold value; and
discontinuing the sending of the second content data.

* * * * *